April 15, 1924.

A. FORTIN ET AL

HOSE COUPLING

Filed Feb. 10, 1922

Inventors
A. Fortin & J.B. Fortin

Attorney

April 15, 1924.  1,490,771

A. FORTIN ET AL

HOSE COUPLING

Filed Feb. 10, 1922  2 Sheets-Sheet 2

Inventors
A.Fortin & J.B.Fortin
By
Attorney

Patented Apr. 15, 1924.

1,490,771

UNITED STATES PATENT OFFICE.

ADELARD FORTIN AND JEAN BAPTISTE FORTIN, OF MONTREAL, QUEBEC, CANADA.

HOSE COUPLING.

Application filed February 10, 1922. Serial No. 535,580.

*To all whom it may concern:*

Be it known that we, ADELARD FORTIN and JEAN BAPTISTE FORTIN, British subjects, residing at 587 Davidson St., in the city of Montreal, Province of Quebec, Dominion of Canada, have invented certain new and useful Improvements in Hose Couplings; and we do hereby declare that the following is a true, clear, and correct description of the same.

The present invention relates to certain improvements in hose couplings, hereinafter described and illustrated in the accompanying drawings, in which:—

Like numerals of reference indicate corresponding parts in each figure.

Figure 1:
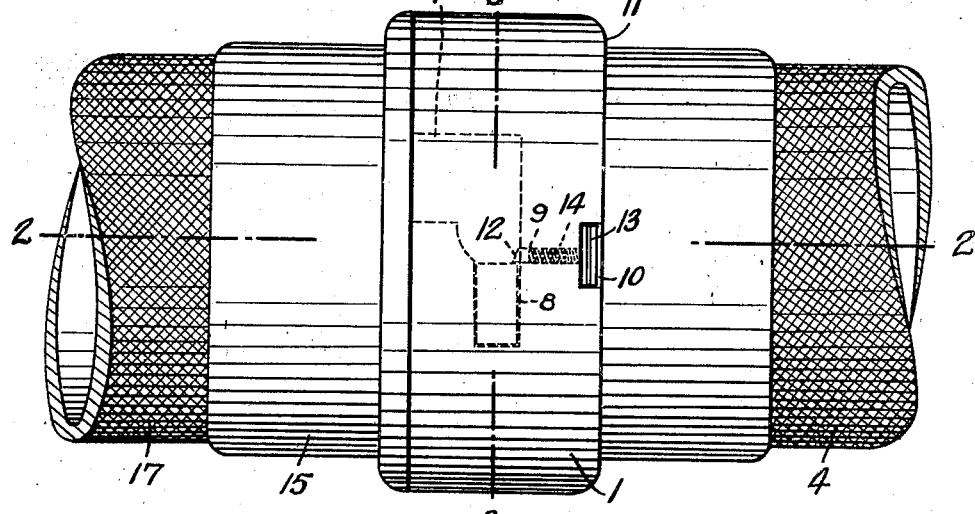
Figure 1 is a side elevation of the improved coupling showing portions of the hose sections connected thereto.
Figure 2:
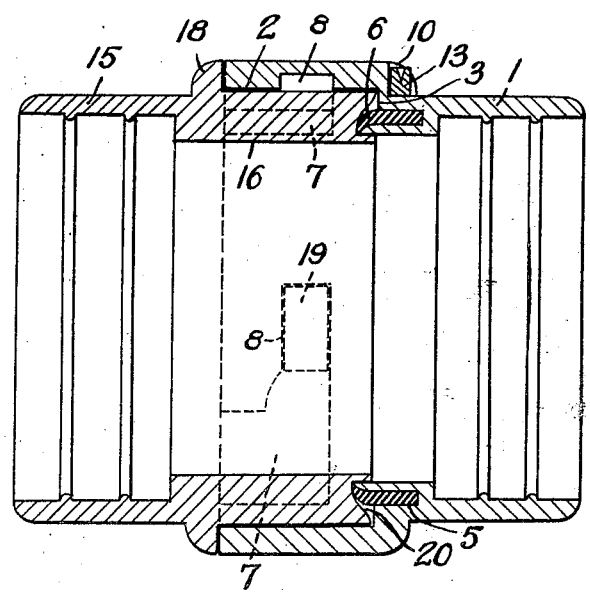
Figure 2 is a longitudinal section on line 2—2 of Figure 1, the hose portions having been removed.
Figure 3:
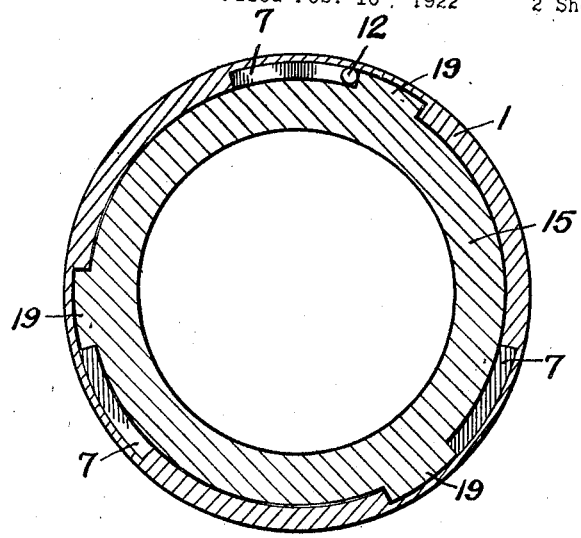
Figure 3 is a cross section on line 3—3 of Figure 1.
Figure 4:
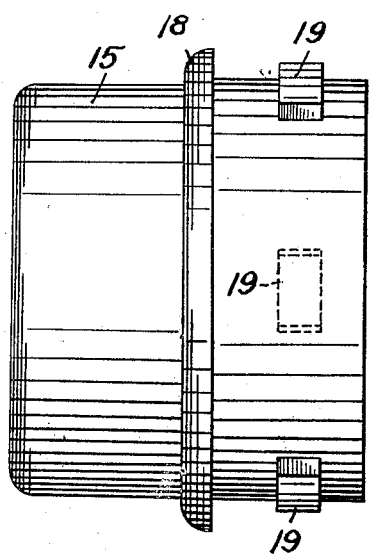
Figure 4 is a side elevation of the male member of the coupling, which is disconnected.
Figure 5:
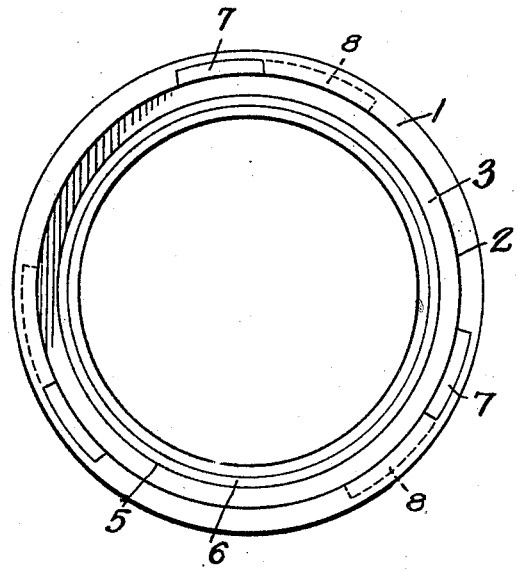
Figure 5 is an end view of the female member, which is disconnected.

In the drawings: 1 is the female member of the coupling consisting of a circular member centrally bored at 2, said bore extending to a circumferential collar 3 and continuing throughout to the opposite end, in which the hose 4 is secured. Within said collar or shoulder 3 a circumferential groove 5 is provided, and 6 is a washer fitting in said groove and having its outer portion extending beyond collar 3 into said groove. Within the circumference of said bored portion 2 is provided a plurality of slots 7 which extend longitudinally throughout a certain distance in the walls of said member 1 and each of which is provided with a lateral extension 8 preferably smaller than the slot 7. On one side of said extension 8 is provided a longitudinal passage 9 which communicates at one end with said extension 8 and at its opposite end with an enlarged hole 10 formed in the outer edge of a shoulder 11 on said member 1. Within said passage 9 is slidably fitted a pin 12 adapted to project slightly across the mouth of the extension 8 at one end, and at the other end of said pin is provided a head 13 by means whereof said pin may be pulled out of said extension. Intermediate of said pin is provided a spiral spring 14 adapted to normally keep said pin in operative position. The male element 15 consists of a circular member bored throughout at 16, one end of which is adapted to fit snugly in the collar portion 3 of said female element 1 while its other end is adapted to receive the hose 17. The central portion of said element is formed with an external circumferential flange or shoulder 18 against which the outer end of said collar 3 directly abuts. At suitable distances from one another on said male element are provided outwardly projecting lugs 19 which are preferably integral with said male element and are adapted to enter the slots 7 fit snugly in the lateral extensions 8 when said male element 15 is slightly turned so as to carry said lugs 19 into their operative position. When said lugs 19 are in operative position the spring held pin 12 drops in behind one of said lugs and locks same therein. By pulling on the head 13, the pin is withdrawn, thus freeing the lug 19 with which it was previously engaged, and the two elements can then be readily uncoupled. The meeting end of said male element 15 is provided with a circumferential slot 20 in which engages the washer 6, in order to form a water tight joint.

What we claim as our invention is:

1. A coupling comprising a female member having an integral collar of greater internal diameter than the body portion of the member, thereby to provide an annular circumferential shoulder within said member at the inner end of the collar where it joins the body portion; a male member having a portion adapted to fit conformably within said collar and to abut at its free end face directly against the face of the shoulder, said abutting faces being formed with confronting annular recesses; an annular washer fitting in one recess and extending into the other; an external circumferential flange formed on the male member at the base of the interfitting portion thereof, and against one face of which the outer end face of said collar directly abuts; a locking lug formed on the external surface of the said interfitting portion of the male member for coaction with a slot formed in the internal surface of the collar, said slot having a lateral extension in which said lug is normally engaged; said collar being also formed with a hole which opens through its external surface and with an internal passage which leads from said hole into the mouth of the extension of said slot; and a latch having a stem which slidably fits in said passage and which normally extends across said mouth to prevent withdrawal of said lug from said extension, said latch also having an operating part which is disposed in said hole.

2. A coupling comprising male and female members having interfitting tubular portions, the external surface of the interfitting portion of the male member having a locking lug formed thereon for coaction with a slot formed in the internal surface of the interfitting portion of the female member, said slot having a lateral extension in which said lug is normally engaged; the female member being provided with a recess which opens through its external surface and with an internal passage leading from said recess into said slot at the mouth of said extension; and a latch having a stem which slidably fits in said passage and which normally extends across the mouth of said extension to prevent withdrawal of said lug from said extension, said latch also having an operating part which normally fits in said recess.

Signed at Montreal, Quebec, Canada, this 20th day of January 1922.

ADELARD FORTIN.
JEAN BAPTISTE FORTIN.

Witnesses:
C. PATENAUDE,
G. BEAUDOIN.